United States Patent
Galietti

(10) Patent No.: US 7,174,311 B1
(45) Date of Patent: Feb. 6, 2007

(54) METHOD AND SYSTEM FOR TEXT DATA MANAGEMENT AND PROCESSING

(76) Inventor: Raymond A. Galietti, 16 Oakwood Way, West Windsor, NJ (US) 08691-9011

( * ) Notice: Subject to any disclaimer, the term of this patent is extended or adjusted under 35 U.S.C. 154(b) by 268 days.

(21) Appl. No.: 09/615,867

(22) Filed: Jul. 13, 2000

(51) Int. Cl.
*G06F 17/30* (2006.01)
*G07F 7/00* (2006.01)

(52) U.S. Cl. .......................... 705/27; 707/10; 434/350
(58) Field of Classification Search ................. 705/26, 705/27; 707/10; 434/350
See application file for complete search history.

(56) References Cited

U.S. PATENT DOCUMENTS

| | | | | |
|---|---|---|---|---|
| 4,153,931 A | * | 5/1979 | Green et al. ................. | 364/200 |
| 5,276,901 A | * | 1/1994 | Howell et al. .................. | 707/9 |
| 5,532,920 A | * | 7/1996 | Hartrick et al. ............. | 715/500 |
| 5,734,719 A | * | 3/1998 | Tsevdos et al. ................ | 380/5 |
| 6,029,079 A | * | 2/2000 | Cox et al. .................... | 600/407 |
| 6,460,036 B1 | * | 10/2002 | Herz ............................ | 707/10 |
| 6,622,003 B1 | * | 9/2003 | Denious et al. ............. | 434/350 |

FOREIGN PATENT DOCUMENTS

WO 9936917 * 7/1999

OTHER PUBLICATIONS

Anders et al., "online vs cd-rom—the impact of CD-ROM databases upon a large online searching program" ONLINE, v12, n6, p24(9), Nov. 1988.*

* cited by examiner

*Primary Examiner*—Michael Cuff
(74) *Attorney, Agent, or Firm*—Watov & Kipnes, P.C.

(57) ABSTRACT

A method and system for delivering programmed textual and graphical material to computer network based users includes a central computer system including software controlled central processor unit (CPU) for operating a memory to establish access to one or more databases in which profiles of a plurality of users are stored and updated, and textual and graphical material content are classified and matched. A user uses a personal computer for selecting information and receiving information over the computer network from the database of the remote computer system for display or viewing.

23 Claims, 4 Drawing Sheets

METHOD AND SYSTEM FOR TEXT DATA MANAGEMENT AND PROCESSING

FIELD OF THE INVENTION

The present invention is directed to information handling systems, and more particularly to a system and method for allowing a user to access and read selected portions of text from electronic versions of book volumes belonging to various sources including publishers and authors, stored in one or more remote computer storage locations.

BACKGROUND OF THE INVENTION

Recently over the years, books particularly school textbooks carried by students have proliferated in numbers, and each have grown increasingly bulkier and heavier. This trend has been set largely in part by tougher academic regimen in school programs, and considerable pressure on the part of publishers to increase profitability. As a result of this trend, many of the students are now forced to use large-capacity book bags or backpack-type bags for carrying heavy book loads to and from school, and sometimes, between classes. There have been instances where students had to carry loads in excess of their own body weights. Students who carry loads above what is considered medically safe, are especially prone to developing posture problems, neck/back pains and injuries, and possibly permanent spinal damage.

Current medical statistics show that more than 3,300 children between the ages of 5 and 14 were treated in emergency rooms for injuries related to carrying full oversized book bags/backpacks, and that up to 60 percent of all children will experience back pain by the time they reach age 18. Moreover, a recent study published in the journal Spine, determined that as much as 6 percent of 10-year-olds complained of back pain, while for 12-year-olds that figure rises to 10–15 percent. Most physicians believe that the main reason for the rising incidence of back pain among the youth may be the modern day book bag—the backpack.

Medical physicians typically recommend that students should carry no more than 10 to 20 percent of their own body weight in order to maintain a healthy spine. Such recommendations are difficult to put into practice by students in view of current academic pressures and obligations. Most students also undertake after-school activities which require them to carry more items such as additional books, musical instruments, sports gears, clothing, supplies, and the like. To reduce the burden on their backs, some students have resorted to using wheeled suitcases for transporting books and other items. However, such bulky wheeled suitcases pose their own problems and concerns associated with safety, mobility, and storage.

The problems plaguing students as described above, is not limited only to students and the school place. Any person who travels from one place to another may also appreciate the difficulties associated with carrying a load of books over some distance.

As to security and safety matters in public places especially on school grounds, carry bags including backpacks have come under greater scrutiny. Responding to such concerns, some administrators in schools have placed strict limits on the use of carry bags and the accessing of school lockers. Such measures have created a desire to find alternative means for students to transport their educational materials.

Therefore, it would be of significant advance in the art of education and text management to develop a text management system comprised of one or more remote computers or servers with database memory for providing text storage and maintenance of personalized library profiles for users or subscribers to avoid the burdens of physical books. A user would access his/her personalized library profile via a personal computer connected by a computer network to the computer or server for permitting the user to retrieve select text works for viewing, reading, and/or printing. The system provides a user with mobile access to his/her personalized library profile as assigned to the specific user. The computerized library is relatively inexpensive to implement, easily accessible, and widely available wherever the user can access the remote server of the system via the computer network.

The computer network can be a local area network (LAN), wide area network (WAN), or the Internet, for example, in fact, through the use of either a LAN or WAN, public libraries may be converted into computerized public libraries for accessing electronic versions of book volumes therethrough, eliminating physical books, and thereby reducing the physical size of the library and the costs associated with maintaining a physical library. Such a computer system can be easily implemented and maintained in a cost efficient and effective manner using current and developing technologies.

In the educational arena, the student user or the school can select the text works to be included in the personalized library profile of the student user as well as provide a schedule of work assignments for a particular school cycle. One benefit of such systems is that students and non-students alike can personalize their respective library profiles for their own purposes and needs, and remotely access the "libraries" from home, school, workplace, public library, and other sites. The system enables the student or non-student to "virtually carry" their books from one place to another without the physical difficulties, problems, and complications described above. Another benefit is the reduction or elimination of the incidence of lost or damaged books because the text of the book volumes are stored on the remote computer systems in the associated database or memory, and not on the person of the user. A further benefit relates to the promotion of security and safety in public places especially on school grounds for the student population at large.

SUMMARY OF THE INVENTION

The present invention is generally directed to a method and system comprised of one or more remote computer systems or servers which provides mass storage of electronic text libraries and personal library profiles individually assigned to each user, and a computer network selectively permitting users to use their personal computers to connect through the network to the remote computer system to gain access to his/her personalized text library. The method and system is relatively inexpensive to implement, easily accessible and widely available via personal computers connected to the computer network, and can be maintained in a cost efficient and effective manner.

In particular, one aspect of the present invention is directed to a method and system of enabling a plurality of users to each individually operate a user computer system connected to a communication link to remotely retrieve discrete data units from one of a plurality of electronic publications stored on a central computer system via a communication link connected therebetween for local viewing by the user, a single reader. The present method and system comprises:

(a.) establishing a library database in a central computer for storing a plurality of electronic publications, each of the publications comprised of a plurality of discrete data units;

(b.) establishing a user profile database in the central computer for storing a plurality of individual user profiles, and through which user is provided with selective access to the library database;

(c.) receiving a request for data units from a user, and enabling the user to selectively retrieve desired one or more data units from a selected one of the electronic publications;

(d.) determining the validity of the user's request based upon information in the request and information stored in an associated individual user profile of the user profile database;

(e.) transmitting the desired data units upon determining the validity of the user's request, from the central computer system to a user computer system operated by the user via a communication link connected therebetween; and (f.) displaying the desired data units on a display device of the user computer system for viewing by the user, wherein the displaying is performed in response to the transmitting the desired data units from the central computer system to the user computer system.

BRIEF DESCRIPTION OF THE DRAWINGS

Various embodiments of the invention are described with reference to the following drawings, in which like reference characters indicate like items, wherein.

DETAILED DESCRIPTION OF THE INVENTION

Figure 1:
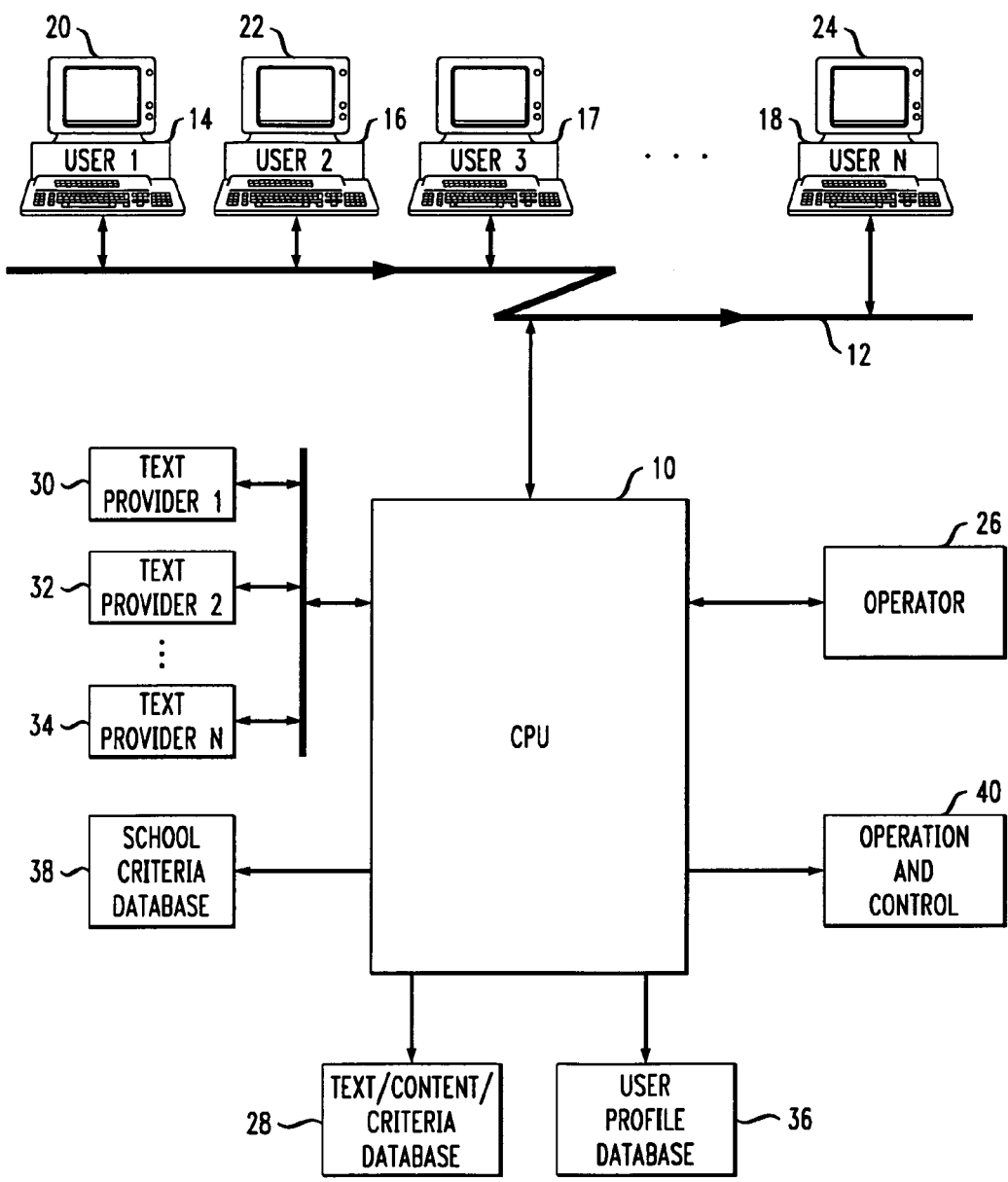
FIG. 1 is a block diagram of the basic system hardware arrangement in an embodiment of the present invention.

The present invention is generally directed to a method and system of text management developed in a manner that provides a user remote access over a communications link such as the Internet to a personal electronic text library stored in a remote central computer system. This method and system of text management substantially eliminates the need to physically transport or carry books between two locations, i.e., from school to home and vice versa. In this manner, users may avoid the physical difficulties associated with carrying weighty loads of books. The method and system is also designed with the advantage of wide accessibility, effective security and ease of use.

In addition, the method and system may be implemented in a manner which allows the user to make further selections or deletions of text works in the personal electronic library depending on the user's school needs, job goals, interests, tastes, and the like. The cost effective and efficient manner by which these systems are maintained and by which the method and system can be implemented makes them especially suitable for academic, educational, occupational, and personal use. The term "text works" as used herein refers to and includes words, symbols, graphic and textual representations, charts, and any other such items found in books, articles, newspapers, magazines, reports, documents and the like in electronic form which can be displayed using appropriate display or reader devices as will be described hereinafter.

The present invention generally comprises a central computer system including a programmable central processor unit (CPU), such as a microprocessor, a database in which the profiles of a plurality of users, including students and non-students, are stored and updated, and a text database for storing text works from various books/text books. The information contained in the profiles includes user identification data and personal library information. The microprocessor may be replaced by a large mainframe computer where high memory storage is required, along with high volume processing of data or text transfers.

Preferably, the users use their personal computers to receive portions of the programmed text works from the database over a computer network such as the Internet. The Internet comprises a vast number of computers that are interconnected through a multitude of communication links. The interconnected computers exchange information using various services, such as electronic mail, Gopher, Archie, Telnet, File Transfer Protocol ("FTP"), and the World Wide Web ("WWW"). It is contemplated that any one of the information transfer protocols available and utilized on the Internet or other telecommunication networks may be used to implement the present invention.

One popular file sharing system utilized is the WWW service on the Internet which is governed by the Hypertext Transfer Protocol (HTTP). With use of the WWW service, a remote computer system (i.e., Web server or Web site) can be accessed to transfer graphical Web pages of information to a user's personal computer system (i.e., client computer). The user can use their computer system to display the information on a monitor or print the information on a printer device. Each resource (e.g., computer or Web page) of the WWW is uniquely identifiable by a Uniform Resource Locator ("URL"). To view a specific Web page, a user computer system specifies the URL for that Web page in a request (e.g., a Hypertext Transfer Protocol or "HTTP" request). The request is forwarded to the Web server that supports that Web page. When the Web server receives the request, it sends that Web page to the user computer system. When the user computer system receives that Web page, it typically displays the Web page using a browser. A browser is a special purpose application program that effects the requesting of Web pages and the displaying of Web pages.

It will be understood that the present invention is further applicable to communications between systems and users that use non-Internet channels, e.g, cable, direct satellite link-ups, direct broadcast, phone modem connections, or any means of communication, provided the method of communication permits delivery of an identified video message or text for display to an identified specific user. The specific textual and graphical material transmitted may vary as a function of the information contained in the profiles of the user in the database. In addition, the profiles may change from time to time with each resulting change in school course work, personal tastes and interests, job goals and the like set by the user or a school, if the user is a student. Furthermore, the programmed text may be changed or modified as a function of the year, the course syllabus, new publishing editions, corrections and other conditions and circumstances.

Referring to FIG. 1, a physical hardware/software configuration of the present invention preferably comprises a central processing unit (referred hereinafter as "CPU") 10 which interfaces via the Internet 12 with a plurality of individual users operating respective telecommunication network/internet access devices currently available or to be developed including but not limited to desktop personal computers, laptop computers, personal digital assistants, cellular communication devices, dedicated reader devices, and any other devices capable of receiving individualized textual and graphical content for video display, production, and print (referred hereinafter as "PCs" or "personal computers") 14, 16, 17 ... 18, which respectively have monitors or display screens 20, 22, 23 ... 24 to display text book material or other textual and graphical information which is transmitted to them via the Internet 12 or a telecommunications network.

The CPU 10 may be any type of computer system, for example a mainframe, a server-based system of PCs, a stand-alone microprocessor and the like. The CPU 10 has the usual operator interface 26, e.g. a keyboard, a graphics/text scanner, and complement of memory and IO devices (not shown). Of significance here is that the CPU 10 maintains a plurality of databases including a text database 28 in which it stores a large library of selectable/searchable text works, i.e., published works of the publishers, distributors, authors, and other text content incorporated from other sources, i.e., publisher, user, student, operator, instructor, school, employer, and the like, hereinafter collectively known as "text providers" 30, 32 ... 34. Such text providers 30, 32, 34 download their respective text works into the CPU 10 for storage in the database 28. The database 28 stores the actual text works, and the profile of the works including information such as the identity of the author and publisher, subject matter category identifiers, and other pertinent information including, but not limited to title, publishing date, ISDN, genre, school, reading level and the like.

The plurality of databases further include a user profile database 36 for receiving and storing the actual profiles of the individual users 14, 16, 17 ... 18. The profiles specify user criteria such as personal identification data, personal library content specifications, account password, system usage data and privileges, text selection history, and the like. Optionally, the plurality of databases may further include a school criteria database 38 for receiving and storing individual school profiles of participating schools or educational institutions. Here, each school profile includes school criteria such as the school name, school identification number, the identification of the participating students, and the individual listings of text works assigned to each student for study. Together, these databases enable the present invention to attain its purpose of receiving, directing and storing text works for facilitated retrieving, transmitting, and displaying of such text works as selected by the individual user.

The operation and control block 40 contains the executable portion of the program code which operates the CPU 10, and which controls the overall operation of the system of the present invention. For example, the operation and control block 40 may include software for handling billing of users for accessing and retrieving of text works.

Figure 2A:
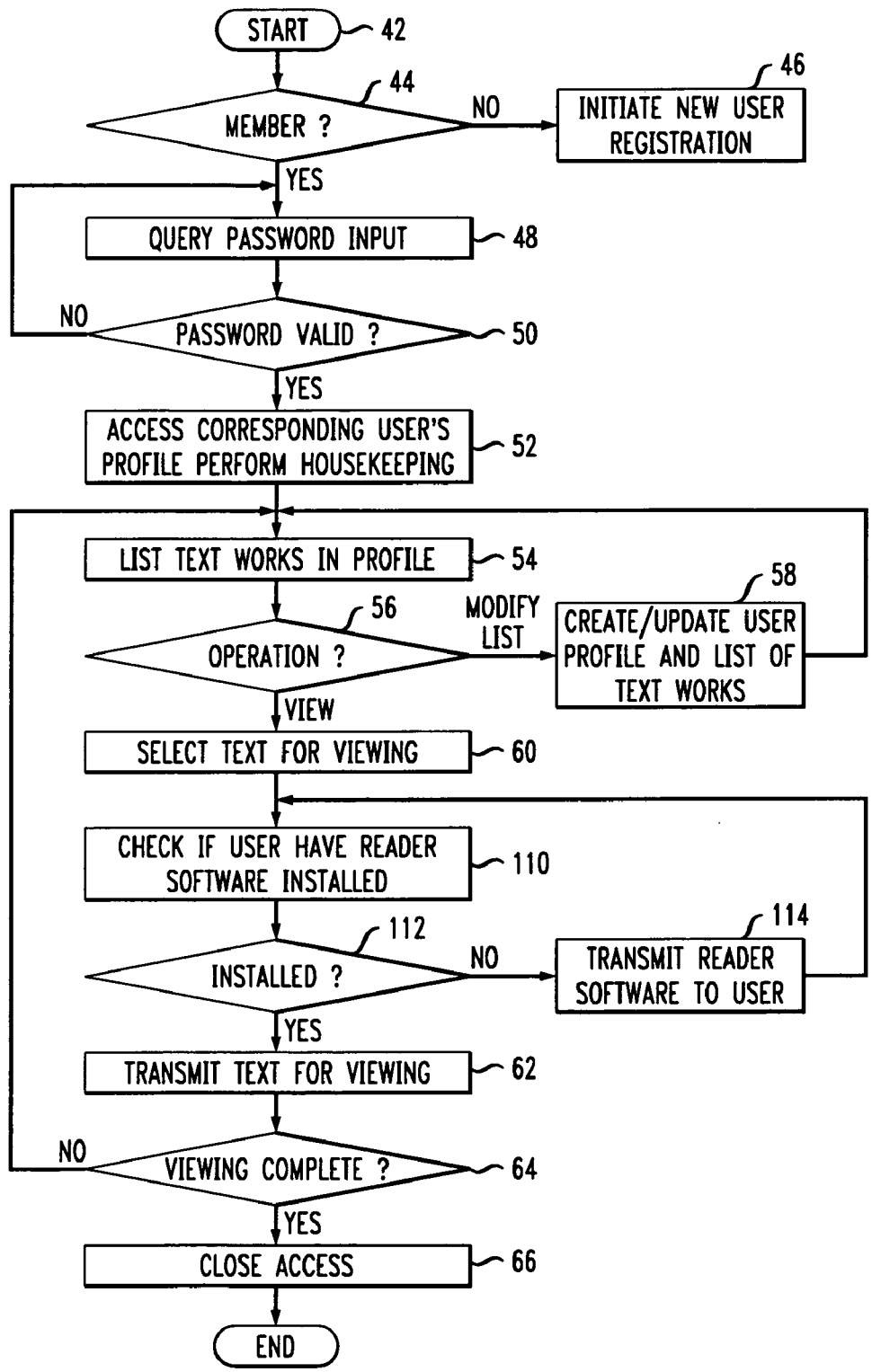
FIGS. 2A through 2C represent a flow diagram of a set routines that enable retrieval of text works from a text library database for an identified specific user.

Referring to FIG. 2A, a representative flowchart is shown of the overall software functions or steps performed by the CPU 10 of FIG. 1. This flowchart is not to be construed as limiting in view of the fact that other configurations of programming steps or software functions can perform the basic premise of the present invention. Proceeding from the starting/initialization software block 42, the program proceeds to a decisional block 44 where it queries whether the user is a registered member of the system. If the user is not registered, the program initiates a new user registration routine 46 which involves creating a new profile or account for the user, and which is more fully described further on by reference to FIG. 2B. Otherwise, the program proceeds to block 48 and queries for a user identification indicator of the user's profile or account and a preassigned password associated with the user identification indicator.

Upon input of the user identification indicator and password, the program proceeds to decisional block 50 where the program searches the user profile database 36 to determine which user profile is associated with the user identification indicator and whether the password is valid. Upon proper validation, the user is permitted access to the profile or account as represented by block 52. There the user may perform housekeeping functions such as changing passwords, modifying personal information, database management, customer and business service, changing appearance/display preferences, and the like. It should be understood that the method and system can be programmed so that different classes of users can be created according to their purpose for accessing the databases and the services each user desires to choose. For example, users who are text providers have greater access privileges to the text database 28 for the purpose of maintaining, updating, removing, modifying, downloading, etc., their respective text works stored on the database 28, and users who are students may be restricted to certain text work titles.

Once the user finishes all housekeeping functions, the program proceeds to the next step of block 54 to display the list of text works associated with the accessed profile. The program proceeds to decisional block 56 where the program queries what operation is to be performed with respect to the list of text works. If the operation is a response to a request from the user to modify the list, the program proceeds to block 58 where the list may be modified as desired by user and, upon approval by the CPU 10 and the operation and control block 40, updated. Block 58 also includes a routine to permit the user to search for other text works according to parameters such as title, author, ISDN, subject matter, key words, genres, publication date, and the like in a search engine program. Once the modifications to the list have been made and updated, the program returns to block 54 to display the updated list. The user is only permitted to access the text works contained on the list associated with the user profile. The program then proceeds to decisional block 56. If the operation is in response to a request from the user to view text works, the program proceeds to block 60. Block 60 includes a routine which permits the user to select the text work and the portion of the text work to be displayed by chapters, pages, line numbers or the like. Block 60 further includes a routine permitting the user to search the selected text work by one or more keyword criteria and the like. The search result may display all the page numbers where the keyword appeared in the text work or some other means for conveying such information to the user.

Once the user selects the text work and selects the portions to be displayed, the program proceeds to block 62 where the program draws the selected text works from the database 28 or some other remote database maintained by other sources as represented by text providers 30, 32 ... 34, and transmits the portions of selected text work over the Internet or some other telecommunication network to the PC 14, 16 ... or 18 for display or viewing on the monitor 20, 22, 23 ... or 24 or printing.

Optionally, the PC 14, 16 ... or 18 may include reader enhancement software which is either installed or loaded upon the download of the portions of the selected text work. Such a reader enhancement software provides to the user a viewing display having high font resolution and rendering capabilities which mimics the convenience, visual sensation and appearance of traditional paper-based text, in addition to providing the benefits of electronic-based text works. The reader enhancement software may also include a flexible copy protection system which allows text providers to distribute their text works with protection from piracy and illegal copying. One such reader enhancement software is the MICROSOFT READER software product offered and sold by Microsoft Corporation.

Once the portion of the selected text work is transferred into user's computer, the user may simply display the text work on the monitor and read it, or print a hard copy of portions of the selected text work on the printer. Once displayed on the monitor, the user may scroll back and forth through the requested and transmitted portion of the selected text work. Once the user finishes reading the text work, the user may then exit the display screen. The program then proceeds to decisional block 64 where it queries whether the user desires to end the program or continue and retrieve another portion of the same text work or select a different text work for viewing. If the operation is a response to a request from the user to continue to another text work, the program proceeds to block 52 for re-accessing the user's profile. Otherwise, the program proceeds to block 66 where the link between the CPU 10 and the PC 14, 16 . . . 18 is terminated or closed.

To prevent illegal copying or piracy of the text work accessible to the user for copyright or proprietary purposes, electronic security measures may be implemented in the system to prevent such misappropriation or misuse. One such measure includes electronically timestamping all text works or files transferred from the remote server database 28 to the user's PC 14, 16 . . . 18. The timestamp program is electronically embedded therein and activates upon a certain preset time or date whereby upon activation prevents the associated text work file from being viewed, copied or accessed. The program may also be programmed to cause the text work to be actively erased from the user's PC 14, 16 . . . 18 upon the expiration of a certain time or date. Other measures include limiting the portion of selected text work by page, chapter, text file size, for example, that is retrievable by the user at a given time to inhibit wholesale copying of the text work and limiting the number of times the portion of the selected text work may be printed. It is understood that the security measures are not to be construed as limiting to those described above, and may include other security measures contemplated and implemented for protecting the proprietary nature and interests associated with the system and the text work accessible by the user therethrough.

Figure 2B:
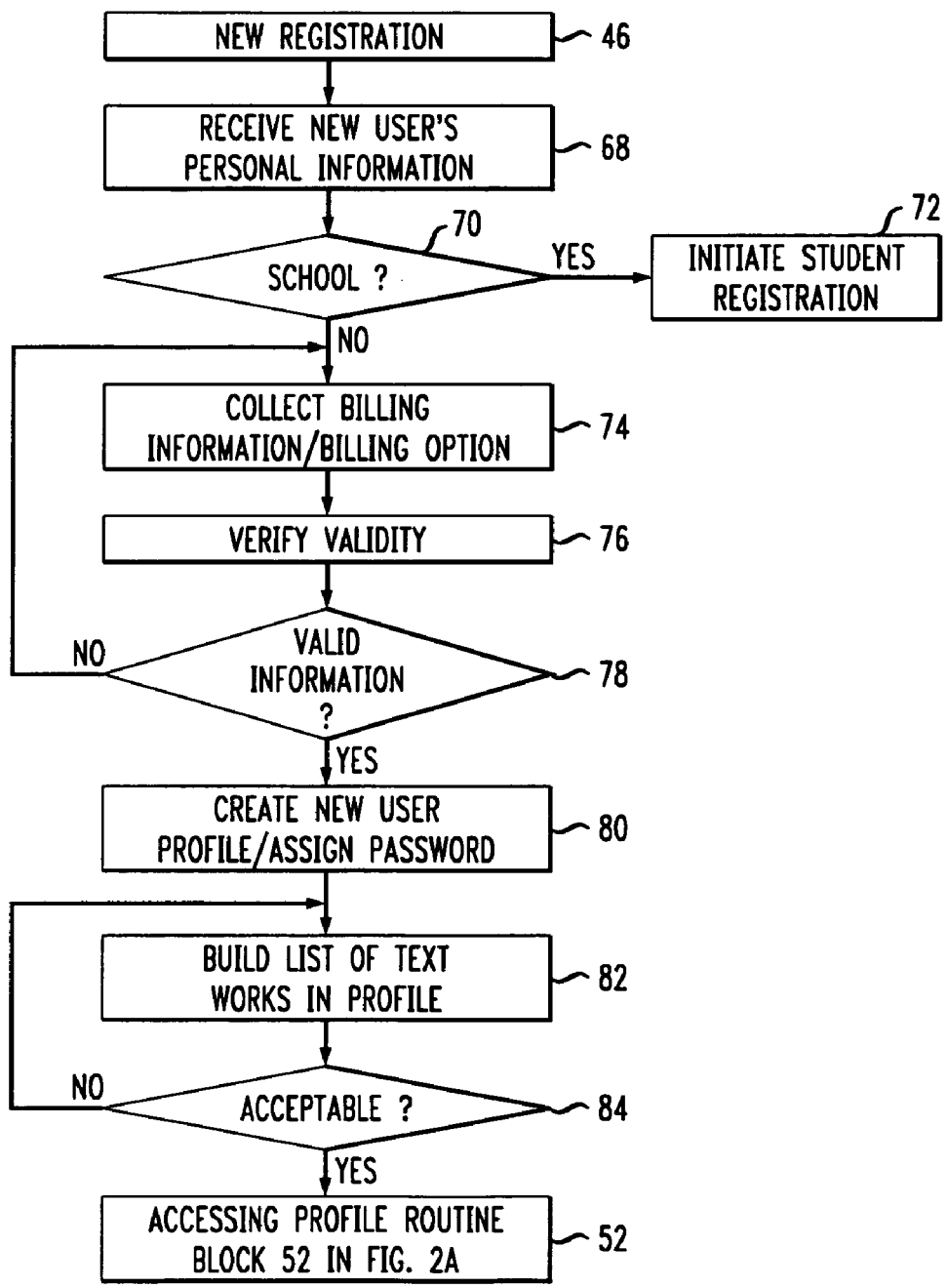

The specific task of responding to a user's request to register for the purposes of allowing non-member users to create a profile or account is illustrated in the general software block diagram of FIG. 2B. In block 68, the program queries and collects from the user personal information such as name, address, service options, purpose of use, and the like. The program proceeds to decisional block 70 to determine whether the user is part of a school database. If the user is part of a school database, the program initiates a student registration routine in block 72 which is more fully described further on by reference to FIG. 2C. Otherwise, the program proceeds to block 74 where it queries and collects billing information, service options and billing options from the user.

Upon receiving the requested information, the program proceeds to block 76 where it initiates a set of routines for verifying the status and completeness of the billing information. If the program determines the billing information is invalid, the program returns to block 74 to repeat the billing information request. Otherwise, the program proceeds to block 80 where it creates a new user profile or account, and assigns a user identification indicator and a password for the newly created profile.

The program initiates a set of routines in block 82 for building a list of text works for the user. The text works will be selected within the various main categories of study, interests or subject matter provided. In the alternative, a search engine may be provided to search for text works according to criteria such as title, author, ISDN, publisher, genre, subject matter, key word, reading level, and the like. Once the selection for the list is made and approved, the program proceeds to determine in block 84 whether the list is acceptable to the user. If not, the routines for building the list are reinitiated in block 84. Otherwise, the program proceeds to block 86 for finalizing and updating the newly created list in the profile and displaying the list of text works chosen by the user. The program proceeds to decisional block 56 of the flowchart in FIG. 2A for determining which operation (i.e., modifying the list of text works and selecting a text work for viewing) the user chooses to initiate as described above.

Figure 2C:
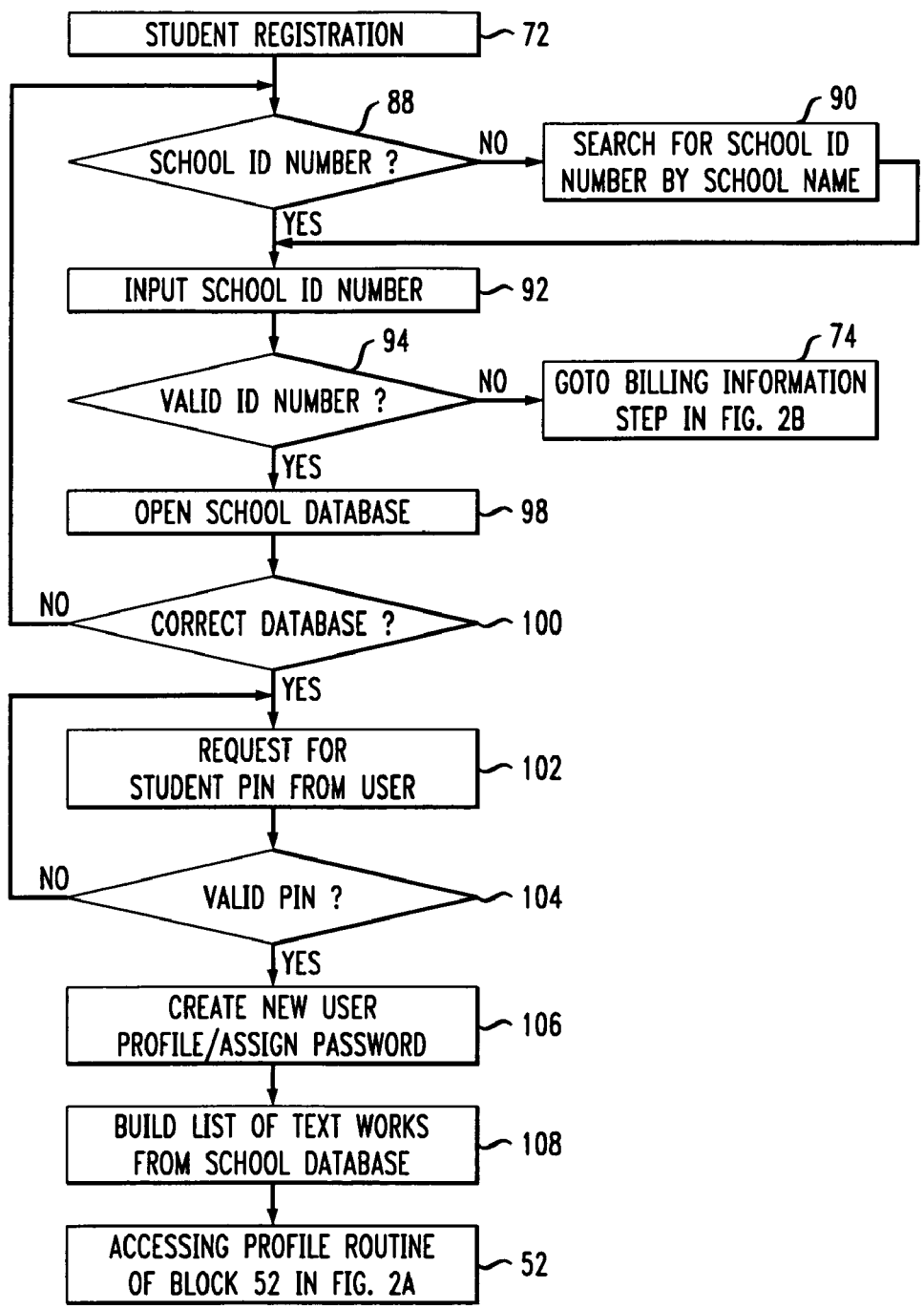

The specific task of registering a student user is illustrated in the general software block diagram of FIG. 2C. In block 72, the program requests for a school identification number of the school where the user is enrolled. Upon receipt of the school identification number, the program proceeds to decisional block 88 to determine whether the user has a valid school identification number. If the user does not know the school identification number, the program proceeds to block 90 where it requests from the user the name of the school the user is enrolled. Block 90 includes a routine that matches the supplied name of the school with the corresponding school identification number and proceeds to block 92 where the matched school identification number is inputted for the user. If the user knows what the school identification number is, the program proceeds to block 92 where the program receives the number. The program proceeds to decisional block 94 to determine whether the school identification number matches with any of the school profiles stored in the school database 38. If the number does not match up with any of the schools stored in the database, the program proceeds to block 74 of FIG. 2B for collecting billing information from the user with the message that the user's school is not a participating member of the system. If the identification number is valid, then the program proceeds to block 98 and access the school profile stored in the school database 38. The program proceeds to decisional step 100 to determine whether the correct profile in the database 38 is accessed. If the user responds that the school selected is incorrect, the program returns to block 88 to reinitiate the school identification number routines. If the database is correct then the program proceeds to block 102 where program requests the user's personal identification number ("PIN") assigned by the school administration. The program proceeds to decisional step 104 and searches the school profile stored in the database 38 to determine the validity of the PIN. If the PIN is not valid, then the program returns to block 102 to re-request the user's PIN. Otherwise, the program proceeds to block 106 where it creates a new user profile and assigns a password corresponding to the new user profile. The program proceeds to block 108 where it builds a prearranged list of text works according to the PIN and the school profile as stored in the school database 38.

Once the list of text works is created and updated in the user profile, the program proceeds to block 52 of the flowchart in FIG. 2A for determining which operation (i.e., modifying the list of text works and selecting a text work for viewing) the user chooses to initiate as described previously above. For the student users, the scope of operations such as modifying the list of text works, may be limited, and would require the authorization of the associated school or educational institution for which such operations are to be initiated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for eliminating the physical carrying of textbooks by a user to perform homework assignments at a location remote from the user's school in which each user operates a computer system connected to a communication link to remotely retrieve discreet data units from one of the plurality of textbook electronic publications stored on a central computer system via a communication link connected therebetween comprising the steps of:
    (a.) establishing a list of textbooks for each user for a predetermined academic period;
    (b.) establishing by a school or school authorized entity a library database comprised of a plurality of textbook electronic publications including the textbooks contained in the list of textbooks in a central computer which together make up the textbooks used in teaching a school curriculum, each of said textbook electronic publications comprised of a plurality of discrete textbook data units generally containing subject matter not found in the others of said textbook electronic publications;
    (c.) establishing a user profile database in said central computer for storing a plurality of individual user profiles, each user profile associated with a list of at least one target textbook electronic publication which corresponds to the textbooks the user will use during said predetermined academic period selected from said plurality of textbook electronic publications and through which the user is provided direct with non-fee paying, limited selective access to the target textbook electronic publications within said library database;
    (d.) modifying said list of target textbook electronic publications corresponding to any changes made to the user profile during said academic period;
    (e.) requesting one or more desired textbook data units from one of said target electronic publications without the direct payment of a fee;
    (f.) determining the validity of the user's request for data units from said textbook electronic publication by comparing the request with information stored in the corresponding individual user profile including said target textbook electronic publication profile database and, if there is a match, the request is a valid request;
    (g.) transmitting said desired textbook data units upon determining the validity of the user's request, from said central computer system to a user computer system operated by said user via a communication link connected therebetween; and
    (h.) displaying said desired textbook data units on a display device of said user computer system for viewing by said user, wherein said displaying step is performed in response to said transmitting of said desired textbook data units from said central computer system to said user computer system.

2. The method of claim 1, further comprising the step of transmitting said desired data units to said user computer system over the Internet.

3. The method of claim 1, further comprising the step of transmitting said desired data units to said user computer system over a radiotelegraphic system.

4. The method of claim 1, further comprising the step of transmitting said desired data units to said user computer system over a cable system.

5. The method of claim 1, further comprising the step of transmitting said desired data units to said user computer system over a satellite-based communication system.

6. The method of claim 1, wherein said desired data units comprise text works.

7. The method of claim 1, wherein said desired data units comprise graphical works.

8. The method of claim 1, wherein said request information comprises user identification input and a password input for enabling user access to the central computer.

9. The method of claim 8, further comprising the step of:
    establishing a registration process for permitting non-registered users who are not registered access to said library database.

10. The method of claim 9, wherein said establishing a registration process comprises:
    receiving personal and billing information from said non-registered user;
    establishing a newly created individual user profile;
    assigning an individual user profile, a user identification and an associated password to said non-registered user to convert the non-registered user to a user; and
    copying said personal and billing information and assigned information to said individual user profile.

11. The method of claim 10, comprising the step of providing a software facility for the handling of billing of access to said plurality of said electronic publications stored on said library database.

12. The method of claim 1, further comprising the steps of:
    receiving selection information of electronic publications from said user;
    evaluating said selection information with information contained in an associated user profile;
    approving said selection information of said electronic publications;
    writing said selection information in said associated user profile for permitting future access to said selected electronic publications; and
    performing review selection processing for permitting the user to review selection information.

13. The method of claim 12, wherein said performing review selection processing comprises:
    displaying said selection information of said electronic publications on said display device of the user computer system;
    receiving modification input from the user to modify said selection information, wherein said modification input operates to modify the selection of one or more electronic publications;
    modifying said selection information upon evaluation and approval of said modified selection information in response to receiving said modification input; and displaying said selection information after said modifying.

14. The method of claim 1, further comprising the step of:
permitting participating electronic publication providers who have satisfied security access criteria to add, modify, or delete electronic publications in said library database.

15. The method of claim 1, prior to the transmitting step, further comprising the step of:
time stamping electronically the data units by said central computer for limiting residence time of the data units in the user computer system.

16. The method of claim 1, wherein the transmitting step further comprises:
limiting the quantity of transmitted data units to a fixed amount for each request.

17. The method of claim 1, wherein said receiving request from the user comprises receiving request from the user which operates to select a search engine for searching for one or more electronic publications.

18. The method of claim 1, further comprising the step of:
enabling the user to search for available electronic publications on said library database by a search parameter selected from a group consisting of title, author, ISDN, publisher, subject matter, and genre.

19. The method of claim 1, further comprising the step of:
establishing a school information database in said central computer for storing a plurality of individual school profiles by which each student user can access a corresponding plurality of preassigned electronic publications stored in said library database.

20. The method of claim 19, further comprising the step of:
establishing a student registration process for permitting the student user to access to said corresponding plurality of preassigned electronic publications.

21. The method of claim 20, wherein said establishing a student registration process comprises the steps of:
receiving school and student information of said student user;
searching said school profile database and corresponding school profile for information relating to said student user;
establishing a newly created individual user profile;
assigning a user identification, a password, and a listing of preassigned electronic publications for access by said student user; and
copying said assignment information to the newly created individual user profile for said student user.

22. The method of claim 21, further comprising the step of:
receiving modification input from the student user to modify the listing of preassigned electronic publications for access by said student user; and
modifying the listing of preassigned electronic publications upon authorization and approval by school authorities.

23. The method of claim 1, wherein said displaying step is performed on a dedicated reader enhancement software installed in said user computer system for providing high font resolution and rendering capabilities.

\* \* \* \* \*